United States Patent Office 3,348,401
Patented Oct. 24, 1967

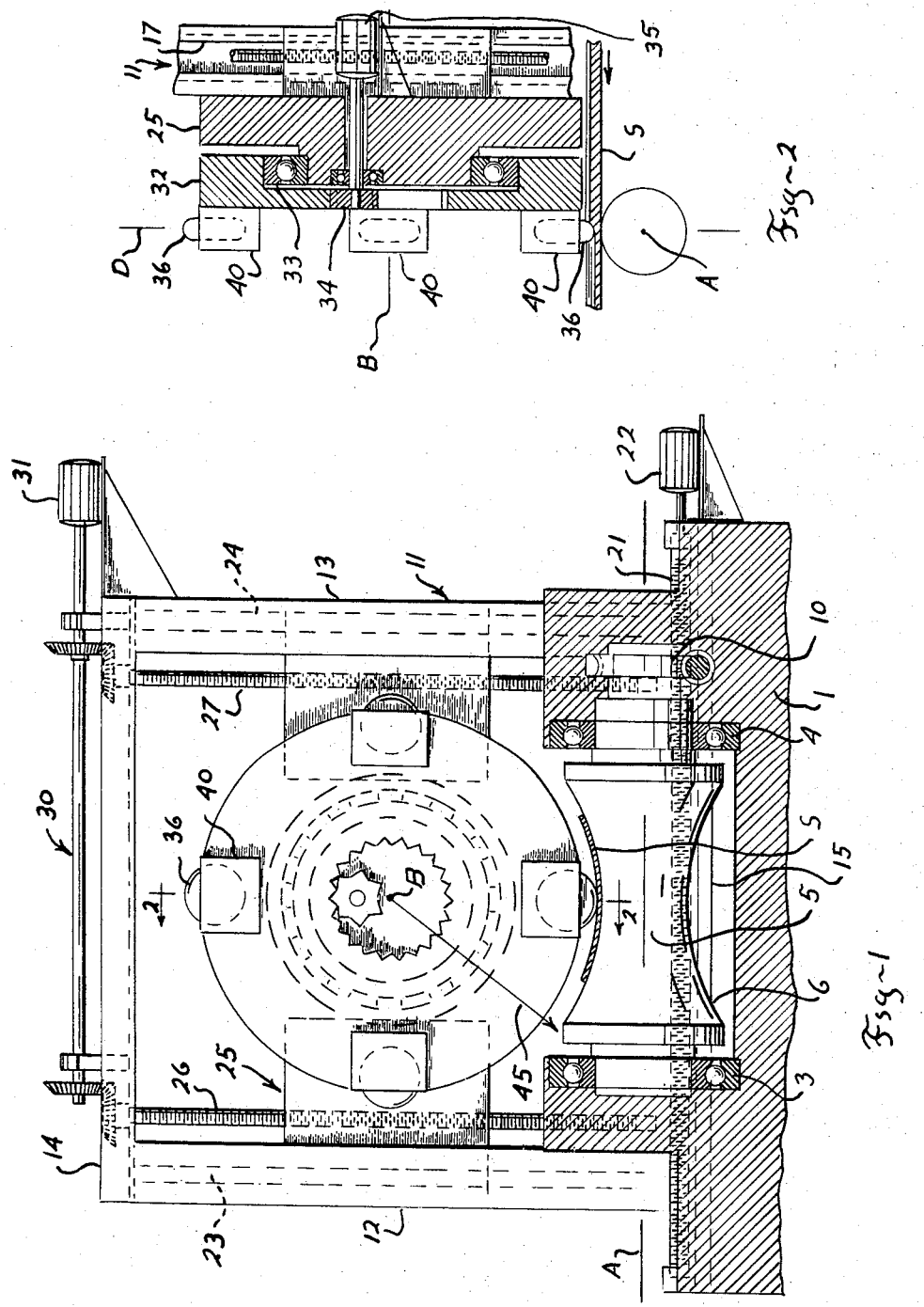

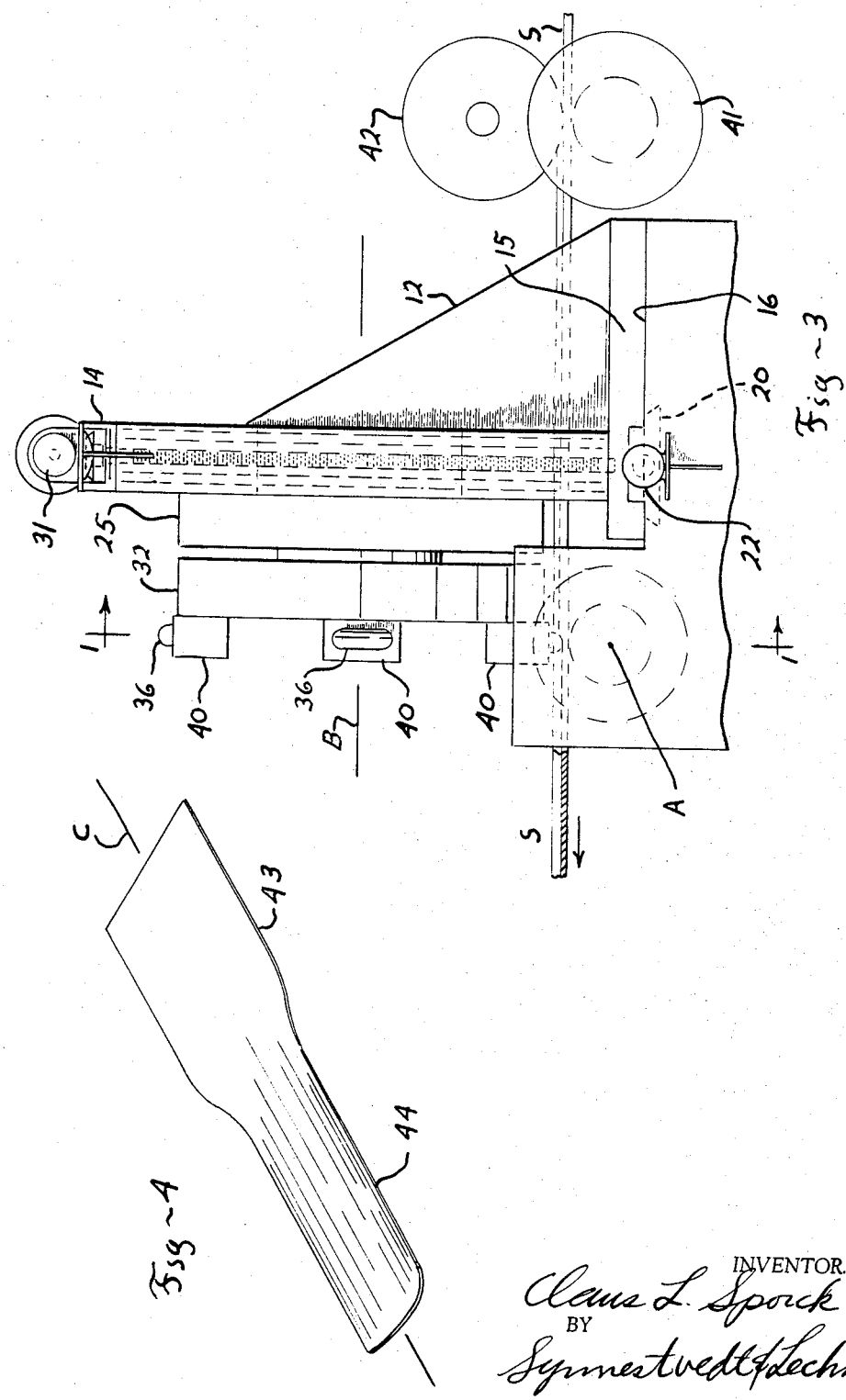

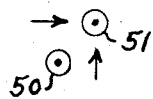
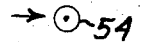
Fig-5
Fig-8
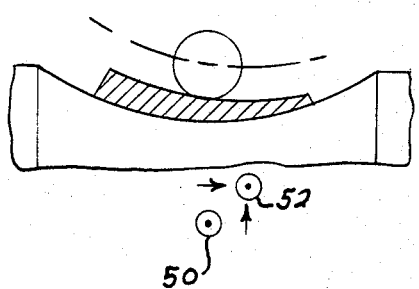
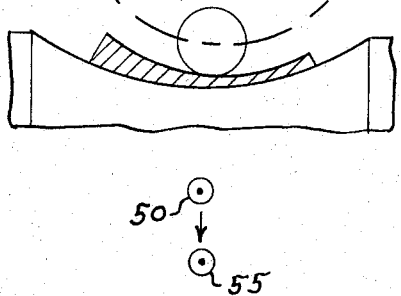
Fig-6
Fig-9
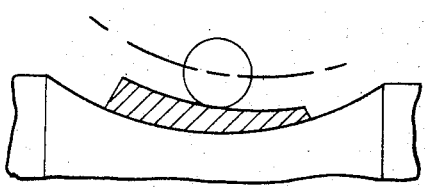
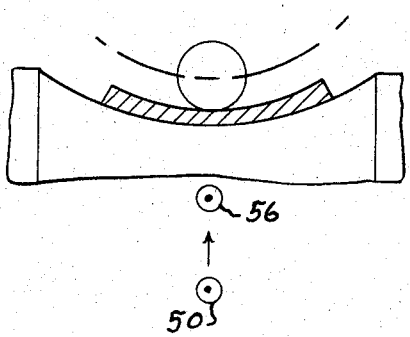
Fig-7
Fig-10
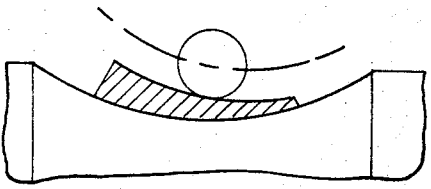
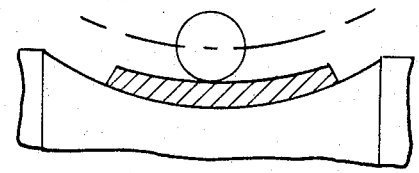

3,348,401
METHODS AND EQUIPMENT FOR THE
WIDENING OF STOCK
Claus L. Sporck, Cincinnati, Ohio, assignor to The
Lodge & Shipley Company, Cincinnati, Ohio, a
corporation of Ohio
Filed Aug. 14, 1964, Ser. No. 389,698
6 Claims. (Cl. 72—178)

This invention relates to the working of metal sheet or strip stock.

More specifically, the invention relates to improvements in methods and equipment for the widening of the stock, for the forming of integral strength members such as ribs, for configuring the stock to have a tapering thickness and for accomplishing the foregoing while maintaining precise and accurate thickness dimension.

In general the invention contemplates improvements in the inventions disclosed in my copending application Serial No. 121,653. In that application I have shown methods and equipment for working stock as mentioned above wherein the working is accomplished so that the stock is reduced in very small increments. This has many advantages as pointed out in the above mentioned application as, for example, by minimizing the distortion of the equipment, and requiring a substantially smaller working force.

One of the principal purposes of the present invention is to provide equipment and methods for the purposes indicated which will attain substantial advantages in simplicity and versatility of apparatus and increase the rate and accuracy at which the stock can be worked. For example, with the equipment of the present invention a piece of stock may be run through for a widening or crown removal operation. Then, by relatively simple adjustments, the next piece of stock can be run through to attain a wholly different configuration, for example, a tapered configuration.

To accomplish the foregoing, the invention provides for supporting a piece of stock such as strip in a manner so that during working the stock is held in an arcuate shape. A plurality of rollers are mounted so that they can rotate around in a circular path. By adjusting the center of rotation of the rollers with respect to the center of the arc of the support surface, the rollers can be made to move along paths which are parallel or non-parallel to the arc of the support surface.

Under parallel conditions of operation the rollers work the stock so that there is uniform thickness across the stock from one edge to another. On the other hand, when the rollers are made to move in paths which are non-parallel to the arc of the support, the stock is worked so that the thickness is non-uniform. For example it may have a taper extending from one edge to another or the taper may extend from a central area towards the edges.

The details of the invention will be described below in connection with the following drawings, wherein:

FIGURE 1 is an elevational view partially in section showing an embodiment of improved equipment of the invention;

FIGURE 2 is a fragmentary, sectional view taken along the lines 2—2 of FIGURE 1;

FIGURE 3 is an elevational view looking towards the left in FIGURE 1;

FIGURE 4 is a diagrammatic view illustrating a piece of stock in the process of being worked.

In FIGURE 1 a bed 1 carries bearing structures 3 and 4 rotatably supporting a roll 5. The roll 5 has an exterior concave working surface 6 which is adapted to support the stock S being worked. A worm and worm wheel means indicated at 10 are adapted to be powered by a conventional motor drive means (not shown), the drive means being adapted to rotate the roll at the desired speed.

The bed carries an open-centered frame structure 11 comprising the standards 12 and 13 and upper and lower cross pieces 14 and 15. As indicated in FIGURE 3, the cross piece 15 rests on a slideway 16 on the bed and is guided for motion (left and right in FIGURE 1) by the jibs 20. The movement of the frame is provided by nuts which cooperate with the drive screw 21 operated by motor 22. The back and forth motion of the frame is parallel to the rotational axis A of the roll.

The standards 12 and 13 are provided with guideways 23 and 24 which movably mount the slide 25 which extends across the frame between the standards 12 and 13. The frame 25 can be moved vertically with respect to the frame by means of the screws 26 and 27 connected by power transmission 30 to the motor 31.

A carrier ring 32 is rotatably mounted on the slide 25 by the bearings 33. The carrier is adapted to be power rotated by the bull and pinion gearing 34 driven by the motor 35. The ring mounts a plurality of rollers 36 which are rotatably mounted on the ring as by the roller rests 40. The roller rests preferably have a structure such as shown in my copending application Ser. No. 313,647, filed Oct. 3, 1963. The rests provide for the rollers to be adjusted radially with respect to the axis of rotation B of the carrier.

With reference to FIGURE 2 it will be observed that the rollers rotate around the axis B in a plane P which contains the axis A of the roll 5.

Typical operations performed by the machine of FIGURE 1 are described below.

It is preferable that the stock be conditioned so that it is at least partially shaped before being worked by the rollers. For this purpose, I have shown in FIGURE 3 a shaping roll 41 which is formed similarly as the roll 5. Disposed above the shaping roll 41 is the shaping roll 42 which has an exterior surface adapted to fit within the concave area of the roll 41. As the stock S, which is in the form say of a flat strip, is brought into the mouths of the rolls 41 and 42, it is shaped into an arc which is concave with respect to the motion axis of the stock. This is diagrammatically shown in FIGURE 4 where the flat strip portion of the stock is indicated at 43 and the concave portion is indicated at 44. As will be observed the portion 44 is concave with respect to the motion axis C.

After leaving the forming rolls 41 and 42 the stock is fed into the mouth of the mill; i.e. the space between the roll 5 and the rollers 36.

With the carrier 32 rotating the rollers 36 move successively across the face of the stock. Each roller follows a concave path which extends in the same direction as the rotational axis A of the roll.

The stock S is moved and the rollers rotated respectively at rates so that each roller successively engages and works small segments of the stock along adjacent paths. The essential requirement for coordinating the stock speed and the roller rotational speed is that each roller, as it moves across its path, reduces only a very small increment of metal. Further details on this incremental reduction are set out in copending application Ser. No. 121,653.

After the stock has been worked it leaves the mill and is sent into a conventional roller stand (not shown) for flattening.

As mentioned heretofore one of the features of the invention is that by adjusting the rotational paths of the roller with respect to the concave surface of the roll 5 the stock can be worked in a variety of ways. This is commented on below.

With reference to FIGURE 1 the radius of the arc which forms the working surface 6 is indicated at 45.

The center of the radius lies in the axis B or from a side view the axis B is tangent to the locus of the center of the radius 45. In this instance, it will be apparent that the working tips 36' of the rollers rotate in a path which is parallel to the surface 6 of the roll 5. The stock S being reduced will have a uniform thickness extending from edge to edge. As the thickness of the stock is to be decreased or increased, this can be accomplished simply by operating mechanisms 40 so that the rollers move radially inwardly or outwardly.

With the above arrangement it will be seen that a wide variety of stock thicknesses can be handled with the equipment by a very simple adjustment.

The thickness adjustments mentioned above have an addtional advantage in making it easy and convenient to form the stock with integral strengthening ribs extending from edge to edge. For rib forming the rollers are drawn inwardly towards the axis B and held in that position until the longitudinal rib thickness is attained. Then the rollers are moved radially outwardly and held in that position to form the valley between adjacent ribs. When the next rib is to be formed the rollers are positioned radially inwardly.

By shifting the carrier axis B either vertically, horizontally or in some combination of two motions, the rollers are made to move in paths non-parallel to the surface of the roll 5 and the stock being worked can be provided with a wide variety of tapered shapes. A few examples of this are shown in FIGURES 5 through 10.

In FIGURE 5, the axis B has been shifted from its position of FIGURE 1 indicated at 50 both vertically and horizontally to the position indicated at 51. Rotation of the rollers around point 51 causes the same to follow paths which are non-parallel to the surface of the roll 5. Under these conditions the stock S will be formed with a taper which extends in a decreasing manner from the left to the right hand side as viewed in FIGURE 5.

It will be apparent that when the axis B is shifted away from the point 50, the axis is no longer tangent to the locus of the center of the radius 45 of the concave roll surface. By shifting, the axis is displaced away from or is non-tangent to the locus.

In FIGURE 6 the rotational axis of the rollers has been shifted from the point 50 to the point 52. The rollers 36 have been moved by the mechanisms 40 radially outwardly. It will be observed that the rollers will rotate about the point 52 in paths which work the stock with a taper the same as FIGURE 1 but of smaller thickness.

In FIGURE 7 the rotational axis has been moved from the point 50 to the point 53. The point 53 is spaced horizontally from 50 the same as the point 52 and has been moved vertically downwardly the same distance from the horizontal as the point 52. However the rollers 36 have been moved radially inwardly. It will be observed that under these conditions the same type of taper has been produced but of an entirely different thickness.

In FIGURE 8 it will be seen that the rotational axis has been moved from the point 50 to the point 54. This is in the same direction as point 53 of FIGURE 7 except that the horizontal component is smaller and the vertical component larger. The mechanisms 40 have moved the rollers generally radially inwardly. Under the conditions described, the rollers are rotated in paths such that the stock will be tapered with increasing thickness starting from a point just to the right of the center and then outwardly towards the opposite ends.

In FIGURE 9 the roller axis has been shifted from the point 50 directly vertically downward to the point 55. With this type of shift the rollers follow paths to produce a taper similar to that of FIGURE 8 except that the taper starts in the center and then extends out to opposite ends.

In FIGURE 10, the axis has been shifted from the point 50 to the point 56 which is the same vertical distance from 50 as the point 55. With the vertical shift, the rollers rotate in paths to produce a taper which starts centrally of the stock and then decreases towards opposite ends.

The positioning of the rotational axis and the radial adjustment of the rollers as described above will produce a wide variety of cross sections in stock. While I have shown only a few examples, it will be apparent to those skilled in the art that many, many variations of taper and thicknesses can be formed.

I claim:

1. Apparatus for providing a taper in metal strip or sheet stock, comprising:
    a roll mounted for rotation about an axis and having an exterior, concave, curved surface of revolution for supporting stock being worked;
    a plurality of rollers;
    a rotatable carrier having means rotatably mounting the rollers on the carrier, the rotation of the carrier causing the rollers to successively move over said concave surface along concave paths which extend in the same direction as the rotational axis of said roll, the roller movement working stock supported on the roll so that the thickness along each path constitutes a taper; and
    means supporting said carrier for rotation about an axis which is transverse to the rotational axis of said roll and including mechanism for shifting the carrier to cause the carrier rotational axis to be tangent or non-tangent with the locus of the center of the radius of said concane surface.

2. Apparatus for providing a taper in metal strip or sheet stock, comprising:
    a roll mounted for rotation about an axis and having an exterior, concave, curved surface of revolution for supporting stock being worked;
    a plurality of rollers;
    a rotatable carrier having means rotatably mounting the rollers on the carrier, the rotation of the carrier causing the rollers to successively move over said exterior, concave, curved surface along concave paths which extend in the same direction as the rotational axis of said roll, the roller movement working stock supported on said roll so that the thickness along each path constitutes a taper; and
    means supporting said carrier for rotation about an axis which is transverse the rotational axis of said roll and which is non-tangent with the locus of the center of the radius of said exterior, concave, curved surface.

3. Apparatus for providing a taper in metal strip or sheet stock, comprising:
    a roll mounted for rotation about an axis and having an exterior, concave, curved surface of revolution for supporting stock being worked;
    a plurality of rollers;
    a rotatable carrier having means rotatably mounting the rollers on the carrier, the rotation of the carrier causing the rollers to successively move over said exterior, concave, curved surface along concave paths which extend in the same direction as the rotational axis of said roll, the roller movement working stock supported on said roll so that the thickness along each path constitutes a taper; and
    means supporting said ring for rotation about an axis which is tangent with the locus of the center of the radius of said exterior, concave, curved surface.

4. Apparaus for providing a taper in metal strip or sheet stock, comprising:
    a bed;
    a roll and means mounting the roll on said bed for rotation about an axis, the roll having a concave working surface for supporting stock to be worked;
    a frame and means mounting the frame on said bed for motion in a direction along the rotational axis of said roll;
    a slide and means mounting the slide on said frame for movement normal to the direction of movement of the frame;

a carrier and means rotatably mounting the carrier on said slide;

a plurality of rollers and means rotatably mounting the rollers on said carrier, rotation of the carrier causing the rollers to successively move over said working surface along a path which extends in the same direction as the rotational axis of said roll, the roller movement working stock supported on said roll; and means for moving said frame and means for moving said slide, the movement of the frame and the slide shifting said carrier to cause the carrier rotational axis to be tangent or non-tangent with the locus of the center of the radius of said concave working surface.

5. A method for providing taper in metal sheet or strip stock comprising the steps of:

supporting a piece of stock for movement along an axis and in an arc form which is concave with respect to the axis;

rotating a plurality of rollers about a common center which is displaced from the locus of the center of the radius of said arc; and moving the stock and causing roller rotation so that the rollers successively engage the stock along adjacent paths which are concave with respect to said stock axis and are transverse said stock axis.

6. A method for providing taper in metal sheet or strip stock comprising the steps of:

supporting a piece of stock for movement along an axis and in an arc form which is concave with respect to the axis;

rotating a plurality of rollers about a common center which lies in the locus of the center of the radius of said arc while maintaining the work tip of each roller a distance from said center which is less than said radius; and moving the stock and causing roller rotation so that the rollers successively engage the stock along adjacent paths which are concave with respect to said stock axis and are transverse said stock axis.

References Cited

UNITED STATES PATENTS 18,058   8/1857   Raymond _____ 72—179

CHARLES W. LANHAM, *Primary Examiner.*

H. D. HOINKES, *Assistant Examiner.*